(12) United States Patent
Forbes

(10) Patent No.: US 6,571,341 B1
(45) Date of Patent: May 27, 2003

(54) USING A HARDWARE-DRIVEN EVENT TO WAKE A COMPUTER FROM A SLEEPING STATE

(75) Inventor: Brian S. Forbes, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/360,364

(22) Filed: Jul. 23, 1999

(51) Int. Cl.[7] .............................. G06F 1/26; G06F 9/00; G06F 15/177
(52) U.S. Cl. ............................. 713/323; 713/2; 709/222
(58) Field of Search ................................. 713/300, 310, 713/323, 2; 709/222

(56) References Cited

U.S. PATENT DOCUMENTS

| | | | | |
|---|---|---|---|---|
| 5,938,771 A | * | 8/1999 | Williams et al. | 713/310 |
| 6,092,208 A | * | 7/2000 | Reneris | 713/323 |
| 6,272,645 B1 | * | 8/2001 | Wang | 713/310 |
| 6,366,957 B1 | * | 4/2002 | Na | 709/229 |

OTHER PUBLICATIONS

Author Unknown, "Advanced Power Management (APM), BIOS Interface Specification", Feb. 1996, Intel Corporation and Microsoft Corporation.

Author Unknown, "Advanced Configuration and Power Interface Specification", Feb. 2, 1999, Intel Corporation, Microsoft Corporation, and Toshiba Corp.

* cited by examiner

Primary Examiner—Thomas Lee
Assistant Examiner—Suresh K Suryawanshi
(74) Attorney, Agent, or Firm—Paul E. Steiner

(57) ABSTRACT

A computer includes two signal lines on which wake events can occur, but the computer's motherboard recognizes wake signals occurring on only one of these signal lines. Therefore, the computer includes a circuit that, in response a wake event on the signal line that is not recognized by the motherboard, delivers a wake signal over the signal line that is recognized by the motherboard.

24 Claims, 2 Drawing Sheets

USING A HARDWARE-DRIVEN EVENT TO WAKE A COMPUTER FROM A SLEEPING STATE

TECHNOLOGICAL FIELD

This application relates to waking a computer system from a sleeping state.

BACKGROUND

Many IBM-compatible personal computer (PC) systems incorporate some form of power management scheme that allows the computer to "shut down" without losing system context. One such scheme is defined in the "Advanced Power Management Specification" ("APM Specification"), version 1.2, published by Intel Corporation and Microsoft Corporation in February 1996. The APM Specification allows three basic power management states: (1) an "ON" state in which the computer operates at full power with full system context; (2) a "SUSPEND" state in which the computer shuts down but preserves system context and continues to consume power in reduced amounts; and (3) an "OFF" state in which the computer shuts down completely, erasing system context and consuming very little, if any, power. Power management under the APM Specification is human-directed power management, meaning that a human user usually decides which of the states the computer will enter at any given moment by activating one or more buttons or switches on the computer.

A later power management specification, the "Advanced Configuration and Power Interface Specification" ("ACPI Specification"), version 1.0b, published by Intel Corporation, Microsoft Corporation, and Toshiba K.K. in February 1999, vests primary control of power management in the computer's operating system (OS). The ACPI Specification defines several sleeping states that involve varying levels of power consumption and system context preservation. Two of these states, known as the "S4" or "Suspend-to-Disk" state and the "S5" or "Soft-Off" state, cause the computer to undergo a full shut-down sequence and reduce power consumption to very small, stand-by levels. The "S4" state preserves only the OS configuration when shutting down the computer, storing configuration information to the computer's hard drive. In the "S5" sleeping state, all system context is lost. In both of these states, power is removed from the computer's processor and main memory, and only a very small amount of stand-by power is provided to the computer's wake circuitry. Awaking from both the "S4" and the "S5" sleeping states requires the computer to undergo a full booting process.

The ACPI Specification does not allow the operating system to wake the computer from either the "S4" or "S5" state. As a result, the Microsoft Windows 98 operating system was designed to disable all wake events other than those generated by a "Sleep" button or power switch on the computer's front panel when the computer is in the "S4" or "S5" state. The ACPI Specification does not preclude responding to "S4" or "S5" wake events from other hardware components in the computer, such as signals received from other computers through a modem or network interface card (NIC), but the Windows 98 operating system does not accommodate other hardware-driven wake events.

SUMMARY

The systems and techniques described here allow hardware-driven events to wake a computer system from a sleeping state from which the computer must undergo a full booting process. The invention is useful, for example, in supporting "S4" and "S5" wake events from PCI-compliant devices in an ACPI-compliant computer running Windows 98. Support of hardware-driven wake events allows remote waking of a computer system through events such as modem rings and queries from a network administrator.

The invention involves waking a computer from a sleeping state. The computer includes two signal lines on which wake events can occur, but the computer's motherboard recognizes wake signals occurring on only one of these signal lines. Therefore, the computer includes a circuit that, in response a wake event on the signal line that is not recognized by the motherboard, delivers a wake signal over the signal line that is recognized by the motherboard.

Other embodiments and advantages will become apparent from the following description and from the claims.

DETAILED DESCRIPTION

Figure 1:
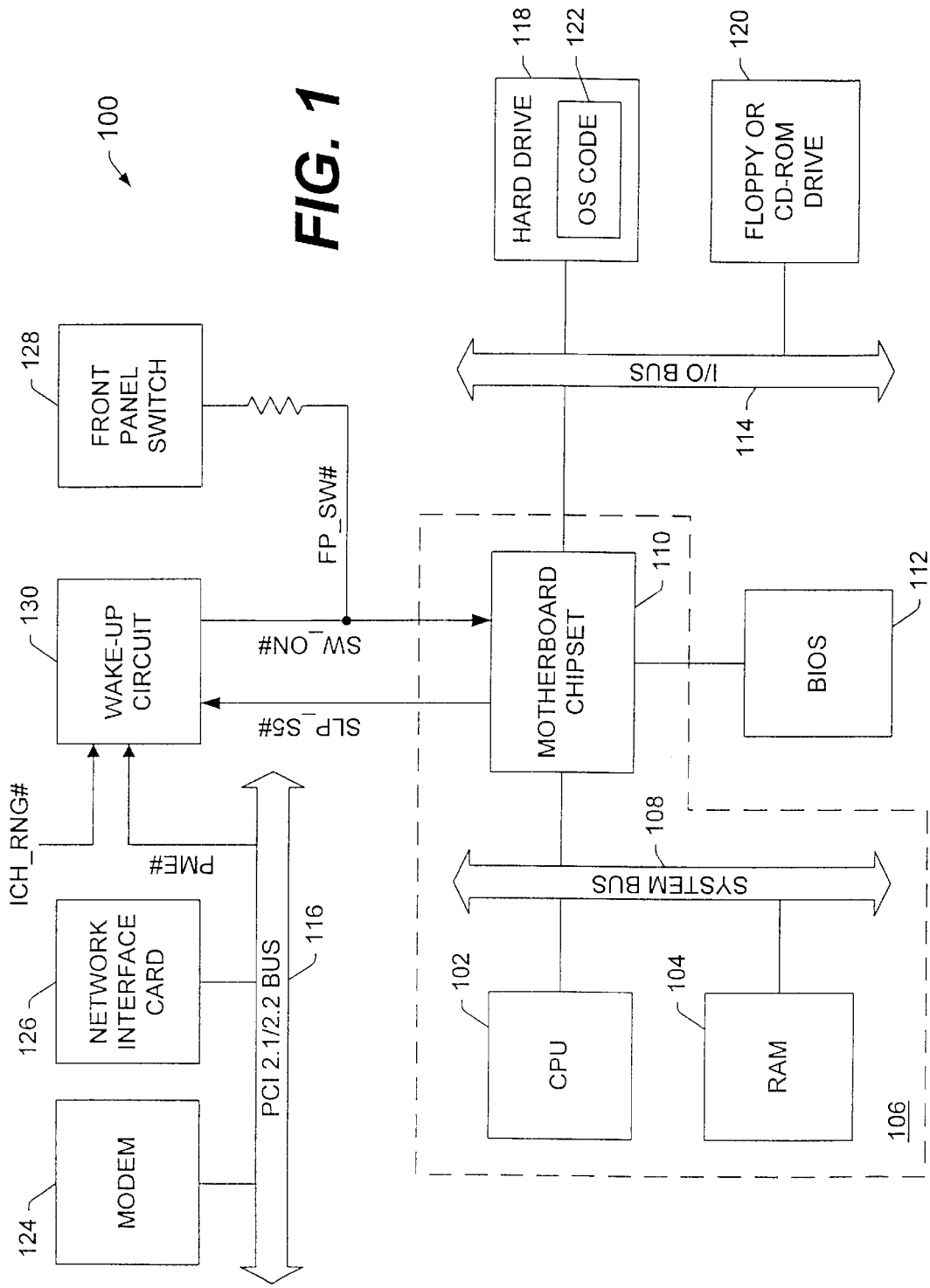
FIG. 1 is a partial block diagram of a computer system that supports hardware-driven wake events.

FIG. 1 shows a computer system 100 that supports remote, hardware-driven wake events from the ACPI "S4" and "S5" sleeping states. The computer system 100 includes at least one central processing unit (CPU) 102, or processor, and a memory unit 104, such as random access memory (RAM), mounted to a motherboard 106. In many systems, the processor 102 and the memory unit 104 reside on separate printed circuit cards that mount to the motherboard 106. A system bus 108 on the motherboard 106 provides a communication path between the processor 102 and the memory unit 104.

A motherboard chipset 110 manages interaction between the system bus 108 and other system components, such as the computer's basic input/output system (BIOS) 112 and peripheral components like those described below. The motherboard chipset 110 includes a system address and data controller, which performs what is known as "northbridge functionality," and an input/output controller hub (ICH), which performs what is known as "southbridge functionality." The motherboard chipset 110 also generates control signals that cause the computer to enter and exit one or more sleeping states, such as the ACPI "S4" and "S5" states. When the computer is in the ACPI "S4" or "S5" sleeping state, the motherboard chipset 110 asserts an active-low sleep signal (SLP_S5#). The chipset 110 keeps this signal deasserted when the system is in any other state.

The computer system 100 also includes one or more data buses that support communication between the motherboard 106 and one or more peripheral components. One such bus is an I/O bus 114, on which the computer's hard drive 118 and floppy/CD-ROM drives 120 reside. The hard drive 118 stores, among other things, the computer's operating system (OS) code 122, which, upon boot-up, is loaded into the computer's memory unit 104 for execution by the processor 102.

Another type of data bus often found in the computer system 100 is a peripheral component interface (PCI) bus 116 that complies with the "PCI Local Bus Specification Rev. 2.1" ("PCI 2.1"), published on Jun. 1, 1995, or the "PCI Local Bus Specification Rev. 2.2" ("PCI 2.2"), published on Dec. 18, 1998, by the PCI Special Interest Group. One or more PCI 2.1/2.2 compliant peripheral devices, such as a modem 124 and a network interface card (NIC) 126, connect to the PCI bus 116. The modem 124 usually ties the computer system 100 to a public switched telephone network (PSTN) or to a cable network, and the network interface card 126 usually ties the computer system 100 to a local or wide area computer network.

PCI 2.1/2.2 compliant devices are designed to respond to certain events initiated remotely, such as an incoming telephone call or a query from a network administrator. Upon detecting a remote event, a PCI 2.1/2.2 compliant device asserts a power management signal (PME#) that is used to wake a sleeping computer system. Likewise, a PCI device that complies with some earlier version of the PCI Specification, such as version 2.0, asserts a ring signal (ICH_RNG#) upon detecting a remote event. However, if the computer is in either the ACPI "S4" or "S5" sleeping state, the Windows 98 operating system does not recognize assertion of the PME# or ICH_RNG# signal as a remote wake event. The Windows 98 platform allows the computer to awaken from the "S4" and "S5" sleeping states only in response to a signal (FP_SW#) asserted by the computer's front panel power switch 128.

To remedy this limitation of the Windows 98 platform, the computer system 100 takes advantage of the fact that the ACPI Specification prohibits only software-initiated wake events (such as the PME# or ICH-RING# signals) in the "S4" and "S5" sleeping states. The system 100 includes a wake-up circuit 130 that supports hardware-driven events from components other than the front panel power switch 128. The wake-up circuit 130 generates an interrupt signal (SW_ON#) that is combined with the FP_SW# signal from the front panel power switch 128 and delivered to the motherboard chipset 110. One technique for combining the two signals involves connecting a resistor 135 between the front panel power switch 128 and the wake-up circuit 130 to create a wire-OR circuit between the FP_SW# and SW_ON# signals. Combining the signals in this manner ensures that the FP_SW# pin of the motherboard chipset 110 is driven when either the FP_SW# signal or the SW_ON# signal is asserted. This causes the operating system to treat the PME# and ICH_RNG# signals from PCI-compliant devices as signals from the front panel power switch 128. As a result, the computer system 100 awakens from the "S4" and "S5" sleeping states in response to remote wake events detected by PCI-compliant devices.

Figure 2:
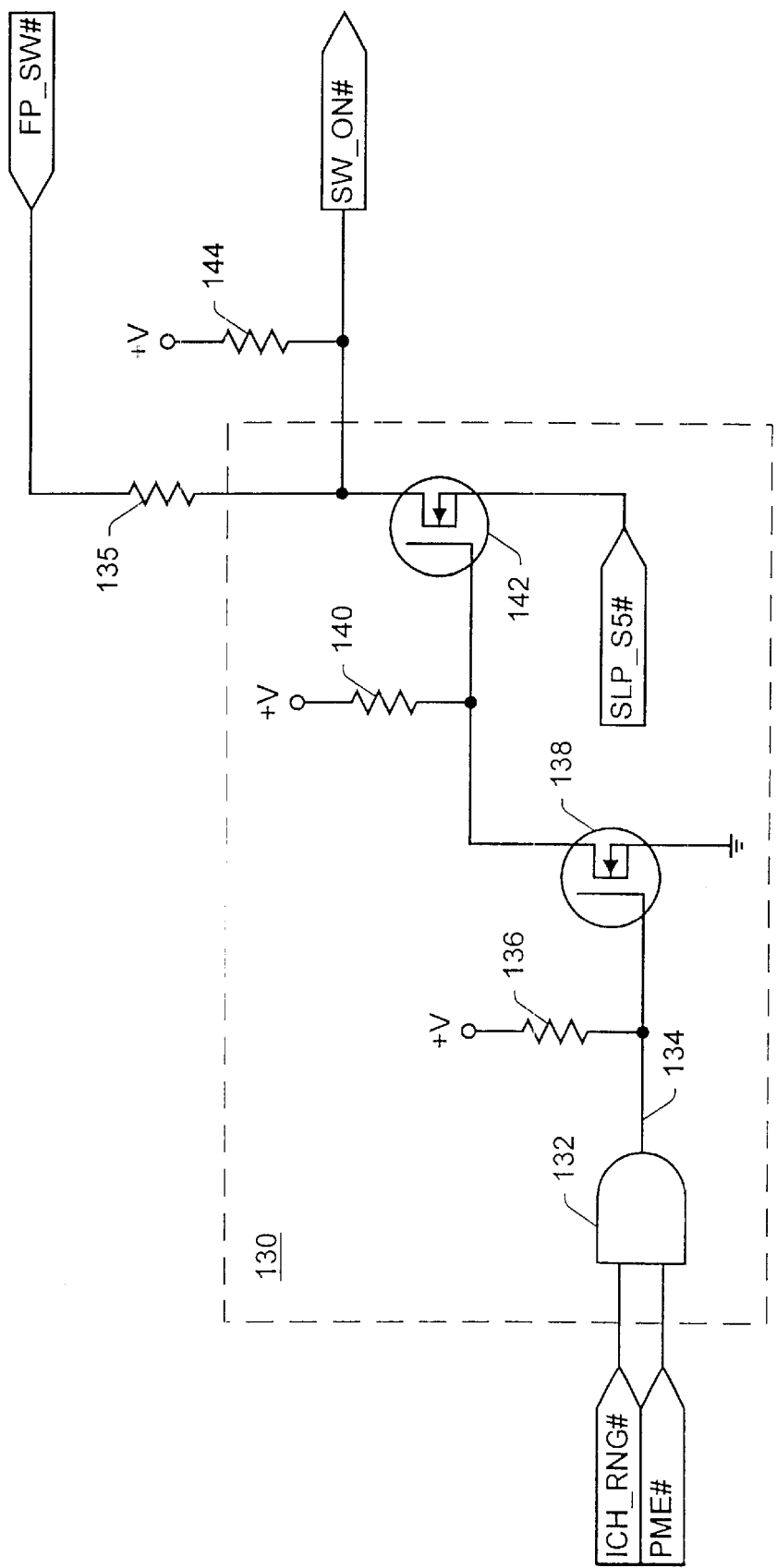
FIG. 2 is a schematic diagram of a circuit that propagates hardware-driven wake events to the computer's motherboard.

FIG. 2 shows one implementation of the wake-up circuit 130. In this implementation, the circuit 130 receives the PME# and ICH_RNG# signals from PCI-compliant devices and the SLP_S5# signal from the motherboard chipset 110. The circuit 130 includes an AND gate 132 that receives the active-low PME# and ICH_RNG# signals and asserts an active-low signal (S4/S5_PME#) on an output line 134 when either of the input signals is asserted. The output line 134 from the AND gate 132 connects to a pull-up resistor 136 and to the gate of a switching transistor 138, such as an n-channel field effect transistor (FET). The source of this transistor 138 connects to a low-voltage node, such as ground. The drain connects to a pull-up resistor 140 and to the gate of an output transistor 142, such as an n-channel FET.

The source of the output transistor 142 receives the SLP_S5# signal from the motherboard chipset 110, and the drain drives the SW_ON# signal. The drain of the output transistor 142 also connects to the resistor 135 that forms the wire-OR circuit between the FP_SW# signal and the SW_ON# signal. A pull-up resistor 144 also connects to the drain of the output transistor 142 to complete the wire-OR circuit.

The truth table below illustrates the operation of the wake-up circuit 130. When the computer system 100 is in neither the "S4" nor the "S5" sleeping state, the SLP_S5# signal from the motherboard chipset 110 is not asserted, and the wake-up circuit 130 is not active. Incoming wake events have no affect on the system (rows 1–4).

When the computer system 100 is in either the "S4" or the "S5" state, the motherboard chipset 110 asserts the SLP_S5# signal and thus activates the wake-up circuit 130. As long as no remote wake-up events occur, the S4/S5_PME# signal from the AND gate 132 remains deasserted, and the output transistor does not assert the SW_ON# signal (row 5). If either or both of the PME# and ICH_RNG# signals are asserted, indicating the occurrence of a remote wake event, the AND gate 132 asserts the S4/S5_PME# signal, and the output transistor 142 asserts the SW_ON# signal (rows 6–8).

| | ICH_RNG# | PME# | S4/S5_PME# | SLP_S5# | SW_ON# |
|---|---|---|---|---|---|
| 1 | 1 | 1 | 1 | 1 | 1 |
| 2 | 1 | 0 | 0 | 1 | 1 |
| 3 | 0 | 1 | 0 | 1 | 1 |
| 4 | 0 | 0 | 0 | 1 | 1 |
| 5 | 1 | 1 | 1 | 0 | 1 |
| 6 | 1 | 0 | 0 | 0 | 0 |
| 7 | 0 | 1 | 0 | 0 | 0 |
| 8 | 0 | 0 | 0 | 0 | 0 |

* All signals are active low.

The SW-ON# signal connects to the FP_SW# pin of the motherboard chipset 110. Because the SW_ON# signal and the FP_SW# signal are connected by a wire-OR circuit, the FP_SW# pin on the motherboard chipset 110 is asserted when either the output transistor 142 or the front panel power switch 128 asserts its respective output line. As a result, remote wake signals generated by hardware devices other than the front panel switch are used to wake the computer system 100 from the "S4" and "S5" sleeping states.

Other embodiments are within the scope of the following claims. For example, some computer systems may include wake-up circuits that allow hardware-driven events from devices other than PCI-compliant devices to wake the computer from the "S4" and "S5" sleeping states. Moreover, in some systems the wake-up circuit may allow wake events for sleeping states other than the ACPI "S4" and "S5" sleeping states described here. The wake-up circuit shown in FIG. 2 is only one of many circuits that are useful in supporting hardware-driven wake events. In some embodiments, the wake-up circuit is placed on a peripheral card with a wire to the front panel signal line.

What is claimed is:

1. A circuit for use in waking a computer from a sleeping state, the computer including a power switch adapted to generate a wake event on a wake signal line, the circuit comprising:

a first signal line that is adapted to connect directly to the wake signal line;

a second signal line that is adapted to receive a wake signal from a component other than the power switch; and at least one component that, in response to the wake signal from the second signal line, delivers the wake event over the first signal line.

2. The circuit of claim 1, wherein the component includes a switching element that connects the first signal line to the second signal line.

3. The circuit of claim 2, further comprising a sleep signal line that activates the switching element when the computer is in the sleeping state.

4. The circuit of claim 1, wherein the first signal line is directly connected to the wake signal line by a wire-OR circuit.

5. The circuit of claim 3, wherein the switching element comprises a FET having a source node that is active only during the sleeping state, a drain node coupled the first signal line, and a gate node coupled to the second signal line.

6. The circuit of claim 2, wherein the switching element includes two FETs, one driven by the second signal line, and one driven by the other FET.

7. The circuit of claim 6, wherein one FET drives the other FET only during the sleeping state.

8. The circuit of claim 5, wherein the source node is connected to the sleep signal line.

9. The circuit of claim 1, wherein the wake signal from the second signal line corresponds to an event initiated remote to the computer.

10. The circuit of claim 9, wherein the remote event includes an incoming telephone call.

11. The circuit of claim 10, wherein the remote event includes a message from a computer network.

12. A computer system comprising:

a processor and a main memory unit;

a control element that instructs the processor and the main memory unit to enter a sleeping state;

a power switch operable to generate a wake event during the sleeping state;

a wake signal line driven by the power switch and coupled directly to the control element;

at least one hardware component other than the power switch that is operable to generate a wake event during the sleeping state; and a wake circuit connected directly to the wake signal line that places the wake event from the hardware component onto the wake signal line during the sleeping state.

13. The system of claim 12, wherein the wake circuit is connected to the wake signal line by a wire-OR circuit.

14. The system of claim 13, wherein a resistor is connected between the wake circuit and the power switch to create the wire-OR circuit.

15. The system of claim 12, further comprising a sleep signal that activates the wake circuit only during the sleeping state.

16. The system of claim 15, wherein the control element comprises a chipset and the chipset drives the sleep signal.

17. The system of claim 16, wherein the wake circuit comprises a FET having a source node connected to the sleep signal from the chipset, a drain node connected to the wake signal line, and a gate node adapted to receive the wake event from the hardware component.

18. The system of claim 12, wherein the hardware component generates a wake event in response to a remote event initiated outside of the computer system.

19. The system of claim 18, wherein the remote event includes an incoming telephone call.

20. The system of claim 18, wherein the remote event includes a message from a computer network.

21. The system of claim 12, wherein the wake circuit resides on a peripheral card.

22. The system of claim 21, wherein the wake circuit is connected to the wake signal line by a wire.

23. The circuit as recited in claim 1, wherein the component resides on a peripheral card with respect to the computer and an electrical connection is established between the component and the power switch.

24. The circuit as recited in claim 23, wherein the component is connected to the power switch by a wire.

* * * * *